United States Patent
Schaeffer

(10) Patent No.: US 10,246,035 B2
(45) Date of Patent: Apr. 2, 2019

(54) CHARGE TRANSFER FUNCTION IN THE EVENT OF FAILED STARTING

(71) Applicant: Bayerische Motoren Werke Aktiengesellschaft, Munich (DE)

(72) Inventor: Andreas Schaeffer, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 714 days.

(21) Appl. No.: 14/633,416

(22) Filed: Feb. 27, 2015

(65) Prior Publication Data

US 2015/0165993 A1    Jun. 18, 2015

Related U.S. Application Data

(63) Continuation of application No. PCT/EP2013/067901, filed on Aug. 29, 2013.

(30) Foreign Application Priority Data

Aug. 30, 2012  (DE) .................. 10 2012 215 374

(51) Int. Cl.
  *B60L 1/00*    (2006.01)
  *B60L 3/00*    (2006.01)
  (Continued)

(52) U.S. Cl.
  CPC ........ *B60R 16/033* (2013.01); *F02N 11/0866* (2013.01); *H02J 7/0047* (2013.01);
  (Continued)

(58) Field of Classification Search
  CPC .... B60R 16/033; F02N 11/0866; F02N 11/00; F02N 11/0848; F02N 11/10;
  (Continued)

(56) References Cited

U.S. PATENT DOCUMENTS 5,583,418 A * 12/1996 Honda ................ B60L 11/1825
                                                    320/106
6,232,674 B1    5/2001 Frey et al.
                                (Continued)

FOREIGN PATENT DOCUMENTS

CN    201360168 Y    12/2009
CN    201839021 U    5/2011
                (Continued)

OTHER PUBLICATIONS

International Search Report (PCT/ISA/210) dated Nov. 6, 2013 with English translation (seven pages).
                (Continued)

*Primary Examiner* — Hal Kaplan
*Assistant Examiner* — Toan T Vu
(74) *Attorney, Agent, or Firm* — Crowell & Moring LLP

(57) ABSTRACT

A vehicle has an internal combustion engine, with which a starter and a control unit are associated. The starter draws electrical power from a vehicle electrical system battery for an engine start. A back-up battery can be connected in parallel with the vehicle electrical system battery. An electrical connecting element is located between the vehicle electrical system battery and the back-up battery. The connecting element can be controlled by the control unit. In case the engine fails to start, the back-up battery can be connected to the vehicle electrical system battery by the connecting element in order to cause a charge transfer of a specified amount of electrical energy from the back-up battery to the vehicle electrical system battery.

9 Claims, 1 Drawing Sheet

(51) Int. Cl.
  *B60R 16/033*    (2006.01)
  *F02N 11/08*     (2006.01)
  *H02J 7/14*      (2006.01)
  *H02J 7/00*      (2006.01)
  *F02N 11/00*     (2006.01)
  *F02N 11/10*     (2006.01)

(52) U.S. Cl.
  CPC .............. *H02J 7/0054* (2013.01); *H02J 7/14* (2013.01); *H02J 7/1423* (2013.01); *F02N 11/00* (2013.01); *F02N 11/0848* (2013.01); *F02N 11/10* (2013.01); *F02N 2200/062* (2013.01); *F02N 2200/063* (2013.01); *Y02T 10/7005* (2013.01)

(58) Field of Classification Search
  CPC .......... F02N 2200/062; F02N 2200/063; H02J 7/0047; H02J 7/0054; H02J 7/14; H02J 7/1423; Y02T 10/7005
  USPC ......................................................... 307/10.1
  See application file for complete search history.

(56) References Cited

U.S. PATENT DOCUMENTS

| | | | |
|---|---|---|---|
| 6,301,528 | B1 | 10/2001 | Bertram et al. |
| 6,420,793 | B1 | 7/2002 | Gale et al. |
| 2002/0195995 | A1 | 12/2002 | Cook et al. |
| 2004/0212351 | A1 | 10/2004 | Kneifel et al. |
| 2005/0068007 | A1* | 3/2005 | Prema .................... B60K 6/445 320/132 |
| 2005/0285564 | A1* | 12/2005 | Mathews ............ B60L 11/1861 320/116 |
| 2006/0201724 | A1* | 9/2006 | Leblanc ............... F02N 11/0866 180/65.1 |
| 2007/0113814 | A1* | 5/2007 | Tamai ................ B60L 11/1868 123/179.3 |
| 2008/0067973 | A1* | 3/2008 | Ishikawa ................ B60K 6/445 320/104 |
| 2008/0072859 | A1* | 3/2008 | Esaka .................... H02J 7/0019 123/179.3 |
| 2008/0150491 | A1* | 6/2008 | Bergveld ............. G01R 31/361 320/139 |
| 2009/0174682 | A1* | 7/2009 | Bowden ................. B60K 35/00 345/173 |
| 2011/0227537 | A1* | 9/2011 | Maleus ................. H02J 7/0014 320/116 |
| 2011/0320109 | A1* | 12/2011 | Polimeno ............. B60L 3/0092 701/113 |
| 2013/0264869 | A1 | 10/2013 | Klinkig et al. |

FOREIGN PATENT DOCUMENTS

| | | |
|---|---|---|
| CN | 202121336 U | 1/2012 |
| DE | 43 40 350 A1 | 6/1995 |
| DE | 196 45 944 A1 | 5/1998 |
| DE | 198 57 916 A1 | 6/2000 |
| DE | 101 48 248 A1 | 6/2002 |
| DE | 102 29 018 A1 | 2/2003 |
| DE | 103 61 743 A1 | 9/2004 |
| DE | 10 2004 016 292 A1 | 10/2005 |
| DE | 10 2009 043 878 A1 | 7/2010 |
| DE | 10 2010 002 237 A1 | 8/2011 |
| EP | 2 157 313 A2 | 2/2010 |
| EP | 2 457 779 A1 | 5/2012 |
| JP | 11332012 A * | 11/1999 |
| WO | WO 2011/010493 A1 | 1/2011 |
| WO | WO 2012/076123 A1 | 6/2012 |

OTHER PUBLICATIONS

German Search Report dated Apr. 15, 2013 with partial English translation (nine pages).

Chinese Office Action issued in counterpart Chinese Application No. 201380045313.2 dated Feb. 2, 2016 with English translation (12 pages).

* cited by examiner

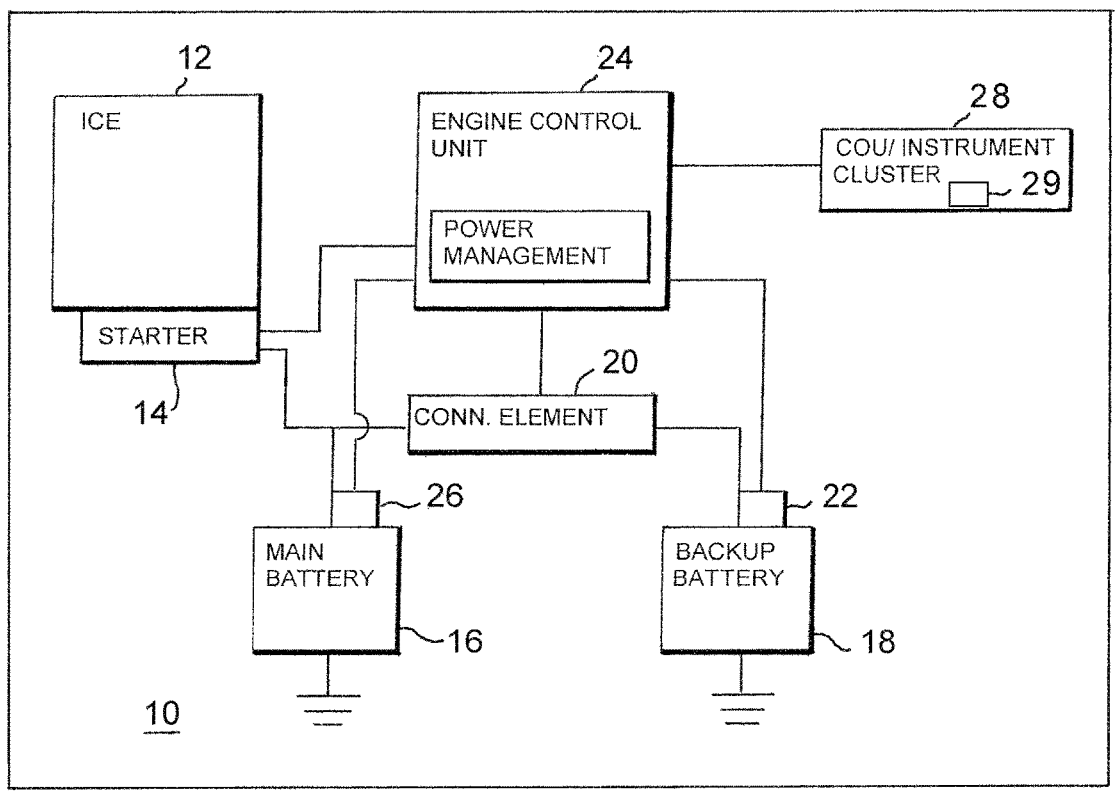

CHARGE TRANSFER FUNCTION IN THE EVENT OF FAILED STARTING

CROSS REFERENCE TO RELATED APPLICATIONS

This application is a continuation of PCT International Application No. PCT/EP2013/067901, filed Aug. 29, 2013, which claims priority under 35 U.S.C. § 119 from German Patent Application No. 10 2012 215 374.8, filed Aug. 30, 2012, the entire disclosures of which are herein expressly incorporated by reference.

BACKGROUND AND SUMMARY OF THE INVENTION

The invention relates to a vehicle having an internal combustion engine to which a control unit and a starter are assigned, which starter draws electric power from the vehicle's electrical system battery to start the internal combustion engine.

Modern vehicles have a multiplicity of electric power consumers or loads. Ensuring a high availability of power to these consumers requires complex power management of the onboard electrical power system. Two-battery vehicle electrical systems, in particular, guarantee high energy availability; see, for example DE 102 29 018 A1.

High energy availability is particularly important in order to ensure a successful start of the vehicle. In the event of a vehicle start failure, i.e. in the event of an unsuccessful attempt to start the internal combustion engine, the vehicle must be tow-started or jump-started in order to start the engine. A jump-start design for a vehicle that has a two-battery vehicle electrical system is described, for example, in DE 103 61 743 A1.

One object of the invention is to provide an improved vehicle.

This and other objects are achieved according to the invention by a vehicle having an internal combustion engine, to which a control unit and a starter are assigned. The starter draws power from an electrical system battery of the vehicle in order to start the internal combustion engine. A backup battery can be connected in parallel to the electrical system battery, with an electrical connection element being located between the electrical system battery and the backup battery. This connection element can be controlled by the control unit with respect to the establishment of a conductive electrical connection between the backup battery and the electrical system battery. In the event of a failed engine start, the connection element will connect the backup battery to the electrical system battery in order to effect a recharging of the electrical system battery with a predetermined quantity of electric energy from the backup battery.

This means that the control unit can initiate a transfer of energy from the backup battery to the electrical system battery following an unsuccessful attempt by the user to start the vehicle. The predetermined amount of energy to be transferred is calculated such that the amount of energy is sufficient to successfully start the engine under normal conditions.

According to a preferred aspect of the invention, the vehicle includes a central operating unit and/or an instrument cluster, on which the recharging process can be indicated during recharging in the form of a visual display.

According to this variant, following the start failure and during the recharging process, a visual indication that recharging is underway is displayed to the user of the vehicle. Once recharging is complete, the visual display is terminated, or the visual display indicates readiness for an engine start.

Thus, the user receives visual notification of the readiness of the vehicle for a new attempt to start the engine once recharging is complete. This offers the advantage that, following an unsuccessful start attempt, the user can be afforded at least one additional promising start attempt, and the user is prepared for such a start attempt by being notified of measures taking place in the vehicle to enable the additional start attempt.

According to a preferred embodiment of the invention, the display includes a timer, with the timer indicating, at the time of recharging, the estimated amount of time remaining until recharging is complete. Thus, the user is notified as to the amount of time remaining for measures being implemented in the vehicle to afford the user the additional attempt to start the vehicle.

According to a particularly preferred aspect of the invention, the connection element is designed as a switch, and a battery sensor that determines the amount of recharging current flowing during the recharging process is assigned to the electrical system battery.

According to another embodiment, the connection element is designed as a d.c. chopper circuit, and a battery sensor is optionally assigned to the electrical system battery, with the d.c. chopper circuit or the battery sensor determining the amount of recharging current flowing during the recharging process.

The use of a d.c. chopper is particularly advantageous. The d.c. chopper determines the voltage being applied to the power interface assigned to the electrical system battery, i.e. essentially the voltage at the electrical system battery. If said voltage drops below a predetermined threshold value following initialization of the d.c. chopper, this can be used as an additional criterion for initiating the recharging process. In this case, an unsuccessful engine start is not a required precondition. If, in contrast, the voltage does not drop below a predefined threshold value following initialization of the d.c. chopper, the control unit can implement a transfer of energy from the backup battery to the electrical system battery via the d.c. chopper after an unsuccessful start attempt has been carried out by the vehicle user.

Information about the recharging current, e.g. obtained by measurement using a battery sensor which measures the battery voltage and the battery power, is necessary for the timer to determine the duration.

For this purpose, the control unit, the d.c. chopper or the battery sensor predicts, according to the principle of extrapolation, the amount of time remaining until the amount of energy transferred reaches the predetermined amount of energy, based on the determined recharging current.

In this process, a one-time determination of the recharging current at the start of recharging is carried out and, assuming a constant recharging current, the amount of time remaining until the predetermined amount of energy is reached is predicted. Alternatively, the recharging current is measured repeatedly during the recharging process and the amount of energy actually transferred is determined by time integration; then, on the basis of this variable, applying the principle of linear extrapolation, the amount of time remaining until the predetermined amount of energy is reached is predicted.

The invention is based on the following considerations.

Conventional vehicles today have a 12-volt energy store (for example, a battery). If the charge status of the energy store is below the startup limit, there is a risk of breakdown.

In vehicles that have a two-battery electrical system, a recharging function can be used to prevent breakdowns. With such a function, with the help of a DC/DC converter and a second battery, the level of charge that is required for a start can be fed back into the main battery. This can be made apparent to the user of the vehicle.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE is a general schematic block diagram illustrating an exemplary vehicle having a charge transfer function in an event of failed starting.

DETAILED DESCRIPTION OF THE DRAWING

Referring to the FIGURE, a vehicle 10, has an internal combustion engine 12 (ICE), as well as a starter 14 for the internal combustion engine 12. Connected to the internal combustion engine via a mechanical drive mechanism is an electric generator, via which an electrical system battery 16 can be charged. In addition to the electrical system battery 16, the electrical system of the vehicle is equipped with a second battery, characterized as a backup battery 18.

The backup battery 18 can be electrically connected to the electrical system battery via a connection element 20, such as a d.c. chopper or a switch. With an electric connection, the backup battery is chargeable, or a charge transfer from the backup battery to the electrical system battery can take place. While the engine is running, the backup battery is preferably charged using excess power from the generator. For this purpose, the electric connection is produced via the connection element. When the backup battery is fully charged, the electric connection is opened via the connection element. The charge status of the backup battery can be determined, for example, by use of a battery sensor 22 that is assigned thereto.

An engine control unit 24 (ECU) is assigned to the internal combustion engine 12. A battery sensor 26 assigned to the electrical system battery 16 communicates at least unidirectionally with the ECU. The connection element 20 can also be controlled by way of the ECU 24.

While the vehicle is idle, the connection element 20 prevents a transfer of electric power between the electrical system battery 16 and the backup battery 18.

When starting the vehicle, the vehicle user switches terminal 50 of the starter, known to a person skilled in the art, to the positive potential of the electrical system battery (terminal change from ignition to engine start) by actuating the ignition key or by pressing a start button. In this manner, with a pinion starter (assumed by way of example, without loss of generality), the solenoid starter switch is activated, thereby engaging the pinion of the starter with the ring gear of the motor, and closing the main starter circuit.

Closing the main starter circuit causes electric power to be fed to the excitation winding of the starter, i.e. terminal 30 is clamped to the positive potential of the electrical system battery. As a result of electromagnetic forces building up between armature and stator, armature torque is generated, which is transmitted to the shaft of the internal combustion engine, in order to start the engine.

If the energy level and the power output capacity of the battery 16 are not sufficient, for various reasons not specified in greater detail here, to transmit sufficient torque to the engine to successfully start it, the start attempt will be unsuccessful. In such cases the torque may not be sufficient even to generate any rotation against the static friction of the crankshaft in the bearing positions. In other cases, even if the starter breaks away, the starter may not accelerate the motor sufficiently.

The ECU, the starter, the ignition mechanism and a battery sensor are members of a data communication system in the vehicle. An unsuccessful attempt to start the engine (hereinafter a start failure) can be detected by way of software, referred to as power management (PM), which can be run on the ECU. Detectability is based on the fact that, if the supply of power to the solenoid starter switch is interrupted, i.e. if the pinion becomes disengaged, no speed will be measured at the crankshaft.

If the PM detects a start failure, the ECU will control the connection element so as to enable a transfer of power from the backup battery to the electrical system battery. This power transfer is referred to as a recharge, and is implemented, for example, by closing the switch or by transmitting a corresponding control signal (hereinafter recharging signal) to the d.c. chopper.

In terms of operating strategy, the backup battery is held in a high charge state. This means, in particular, that when the vehicle is shut off, a potential loss of charge may occur in the backup battery if the switch is open or the d.c. chopper is deactivated, solely as a result of an automatic discharge.

It is assumed in the following that, when a start failure is detected, the charge status of the backup battery is sufficient for recharging.

According to one embodiment, the amount of energy required for recharging (hereinafter recharging amount) can be predetermined by the PM on the basis of various parameters.

According to another embodiment, the amount of energy required for recharging is fixedly predetermined (recharging amount) and is calculated under the assumption that the engine can be started in any case, even with factors that have a negative impact on an engine start (e.g. high-cylinder diesel engine under cold ambient conditions). Without loss of generality, the charge level required for recharging is assumed to be on an order of magnitude of 1-10 Ah.

During recharging, the amount of energy transferred can be determined on the basis of the current flowing during recharging (hereinafter recharging current), which is measured by the battery sensor. This determination can be made by integrating the time of the current measured by the battery sensor or, if measured values for the measured current are transmitted by the battery sensor to the ECU, by the PM. When the amount of energy transferred reaches the recharging amount, recharging is ended (hereinafter recharging end). To achieve this, the ECU opens the switch or deactivates the d.c. chopper.

The recharging process underway is indicated to the vehicle user. This can be accomplished, e.g. by a textual indication in a central operating unit (COU) 28 and/or by a symbol 29 displayed in the instrument cluster (hereinafter recharging indicator). For this purpose, the instrument cluster and/or the central operating unit are likewise components of the data communication system of the vehicle. In addition to activating the switch or the d.c. chopper, the ECU activates the display of the stated visual indicators by transmitting a corresponding signal to the instrument cluster and/or to the central operating unit.

According to one advantageous embodiment, the connection element is designed as a switch. Power is supplied to the switch from the electrical system battery. The switching signal to close the switch and to effect recharging is transmitted from the ECU to the switch. This means that the switch is integrated into the data communications system of the vehicle and requires that the electrical system battery, despite the start failure, must be capable of supplying sufficient residual voltage to supply electric power to the switch and the ECU. The electrical connection produced by the switch also has a switch resistance in order to prevent high short-circuit current from flowing as the switch is being closed. This embodiment assumes that the electrical system battery and the backup battery have approximately the same nominal voltage. The two batteries are preferably designed as lead-acid batteries having a nominal voltage of 12 volts. In this case, it is advantageous for the switch resistance to have an order of magnitude of approximately 0.001 Ohm to 0.05 Ohm.

During recharging, the battery sensor of the electrical system battery, which can be supplied with electric power by the electrical system battery itself or, by closing the switch, by the backup battery, measures the current flowing during recharging. Based on the status of the electrical system battery that led to the start failure, and based on the routine nominal capacities of electrical system batteries of approximately 40 Ah to 110 Ah for passenger vehicles, it can be assumed by approximation that the current flowing during recharging (hereinafter recharging current) from the sufficiently charged backup battery to the electrical system battery is constant. This means that, based on the predetermined recharging amount, and based on the measured recharging current, the time required for recharging can be approximated. For this purpose, the battery sensor transmits the current measured at the start of recharging to the ECU. The recharging time is calculated based on the recharging current and the recharging amount—if at approximately the start of recharging, a recharging current of 30 A is measured with a recharging amount of 3 Ah, the predicted time required for recharging will be approximately 0.1 hours, i.e. 6 minutes.

According to a further preferred embodiment, the connection element is a d.c. chopper. The d.c. chopper is supplied with electric power by the electrical system battery. The switching signal to activate the d.c. chopper and to initiate recharging is transmitted by the ECU to the d.c. chopper. This means that the d.c. chopper is integrated into the data communication system of the vehicle, and it requires that the electrical system battery must be capable of providing sufficient residual voltage to supply electric power to the ECU and the d.c. chopper, despite the failure to start.

The d.c. chopper can further be designed such that at the d.c. chopper power interface, which is assigned to the electrical system battery and via which the d.c. chopper is supplied with electric power, a voltage measurement can be carried out by the d.c. chopper on the electrical system battery, even if the residual voltage in the electrical system battery is no longer sufficient to supply electric power to the ECU. Once the d.c. chopper has been initialized and/or started, the voltage of the electrical system battery can be measured. If this voltage drops below a predefinable voltage limit, the d.c. chopper will effect recharging even if no recharging signal is transmitted to it by the ECU. In this application, insufficient voltage is present in the electrical system battery to supply power to the ECU. Therefore, in this case the ECU will not transmit a recharging signal. During recharging, the d.c. chopper will supply sufficient voltage to the power interface assigned to the electrical system battery to supply electric power to the ECU. The electric power required for the recharging display is likewise supplied via the d.c. chopper by the backup battery. Therefore, a timely attempt to start the engine after the vehicle has been awakened can be enabled, even if the ECU cannot be supplied with electric power by the electrical system battery. The only precondition is sufficient residual voltage to power the d.c. chopper.

According to this embodiment, the time required for recharging is predicted in a manner similar to that of the embodiment using a switch. Alternatively, the recharging time can also be determined on the basis of the predetermined recharging amount and a maximum current that can be transferred by the d.c. chopper (hereinafter set current). For example, if the recharging amount is 4 Ah with a set current of 48 A, the time required for recharging will be 5 minutes.

According to one of the embodiment examples, the predicted time required for recharging can be displayed in the form of a timer to the vehicle user in the central vehicle control unit and/or the instrument cluster during recharging. The timer indicates a time-based value, e.g. the time remaining until the next engine start attempt, e.g. in the form of a number or in the form of a bar-type status display. When the end of recharging is reached, the timer will indicate readiness for another engine start attempt.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   an internal combustion engine;
   a starter assigned to the internal combustion engine;
   an electrical system battery of the vehicle, the starter drawing power from the electrical system battery of the vehicle in order to start the internal combustion engine;
   an engine control unit assigned to the internal combustion engine;
   a backup battery connectable in parallel to the electrical system battery;
   an electric connection element arranged between the electrical system battery and the backup battery, the electric connection element being controllable by the engine control unit,
   wherein
      in an event of an engine start failure using the electrical system battery, the backup battery is electrically connected to the electrical system battery via the connection element in a manner that permits recharging of the electrical system battery with a predetermined amount of electric energy from the backup battery, and
      the engine control unit is configured to determine when the predetermined amount of electric energy has been transferred to the electrical system battery by integrating an amount of electric current supplied by the electrical connection to the electrical system battery over a length of time of the electrical system battery is recharged.

2. The vehicle according to claim 1, further comprising:
   at least one of a central operating unit and an instrument cluster of the vehicle;
   wherein during the recharging of the electrical system battery, at least one of the central operating unit and the instrument cluster is configured to provide a visual indication of a recharging process.

3. The vehicle according to claim 2, wherein when the recharging of the electrical system battery is completed, at least one of the central operating unit and the instrument cluster is configured to provide a visual indication that the recharging process is terminated or a visual indication that indicates a readiness for a start of the internal combustion engine.

4. The vehicle according to claim 2, wherein the visual indication is a timer display, the timer display indicating, at a time of the recharging, a prediction of an amount of time remaining until the recharging is complete.

5. The vehicle according to claim 3, wherein the visual indication is a timer display, the timer display indicating, at a time of the recharging, a prediction of an amount of time remaining until the recharging is complete.

6. The vehicle according to claim 1, further comprising:
a battery sensor assigned to the electrical system battery, wherein
the electrical connection element is a switch and the battery sensor is configured to determine an amount of recharging current flowing during the recharging when the switch is closed.

7. The vehicle according to claim 1, wherein:
a battery sensor is assigned to the electrical system battery,
the connection element is a d.c. chopper, and
the d.c. chopper or the battery sensor is configured to determine an amount of recharging current flowing during the recharging of the electrical system battery.

8. The vehicle according to claim 7, wherein:
the engine control unit, the d.c. chopper or the battery sensor is configured to determine an amount of energy transferred during the recharging of the electrical system battery based on a determined recharging current, and
a prediction of the amount of time remaining until the amount of energy transferred reaches the predetermined energy amount is made based on a linear extrapolation principle.

9. The vehicle according to claim 6, wherein:
the control unit or the battery sensor is configured to determine an amount of energy transferred during the recharging of the electrical system battery based on the determined recharging current, and
a prediction of the amount of time remaining until the amount of energy transferred reaches the predetermined energy amount is made based on a linear extrapolation principle.

* * * * *